(12) United States Patent
Mallela et al.

(10) Patent No.: US 11,763,297 B2
(45) Date of Patent: Sep. 19, 2023

(54) SYSTEMS AND METHOD FOR CONDUCTING AND MANAGING CRYPTOCURRENCY TRANSACTIONS

(71) Applicant: JPMORGAN CHASE BANK, N.A., New York, NY (US)

(72) Inventors: Naveen Mallela, Singapore (SG); Christine Moy, New York, NY (US); Tyrone Lobban, London (GB); Akshika Gupta, Singapore (SG); Srimukh Oddiraju, New York, NY (US); Debidutta Pruthibiraj Samantaray, Singapore (SG); Samer Falah, Staten Island, NY (US); Sai Murali Krishna Valiveti, Singapore (SG); Zhou Zhiyao, Singapore (SG); Raunak Rajpuria, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 74 days.

(21) Appl. No.: 17/151,983

(22) Filed: Jan. 19, 2021

(65) Prior Publication Data
US 2021/0224794 A1     Jul. 22, 2021

Related U.S. Application Data

(60) Provisional application No. 62/962,021, filed on Jan. 16, 2020.

(51) Int. Cl.
*G06Q 20/36* (2012.01)
*G06F 16/27* (2019.01)
(Continued)

(52) U.S. Cl.
CPC ......... *G06Q 20/3676* (2013.01); *G06F 9/547* (2013.01); *G06F 16/27* (2019.01);
(Continued)

(58) Field of Classification Search
None
See application file for complete search history.

(56) References Cited

U.S. PATENT DOCUMENTS 10,373,158 B1     8/2019   James et al.
10,628,822 B1 *   4/2020   Belleville .......... G06Q 20/3672
(Continued)

OTHER PUBLICATIONS

Matteo Bernardini, Blockchains meet Distributed Hash Tables: Decoupling Validatin from State Storage (Extended abstract), 8-12, 2019) (Year: 2019).*

(Continued)

*Primary Examiner* — Kito R Robinson
*Assistant Examiner* — Toan Duc Bui
(74) *Attorney, Agent, or Firm* — GREENBERG TRAURIG LLP

(57) ABSTRACT

A method for digital coin issuance may include: receiving, at a ledger interoperability service and from a gateway communication service, a request to deposit a digital coin balance for an amount of funds for a client to a client digital coin wallet on a distributed ledger; receiving, at an omnibus account, a transfer of the funds from a client demand deposit account for the client; identifying, by the ledger interoperability service, an address for the client digital coin wallet on the distributed ledger using an address book; submitting, by the ledger interoperability service, a request to the gateway communication service to issue the digital coin balance to the client digital coin wallet and to generate postings for the digital coin balance for the distributed ledger; and receiving, by the ledger interoperability service, confirmation from gateway communication service of writing the digital coin balance to the client digital coin wallet.

8 Claims, 4 Drawing Sheets

(51) Int. Cl.

| | |
|---|---|
| *G06F 9/54* | (2006.01) |
| *G06Q 10/10* | (2023.01) |
| *G06Q 20/02* | (2012.01) |
| *G06Q 20/06* | (2012.01) |
| *G06Q 20/10* | (2012.01) |
| *G06Q 20/38* | (2012.01) |
| *G06Q 40/02* | (2023.01) |
| *G06Q 40/04* | (2012.01) |
| *H04L 9/32* | (2006.01) |

(52) U.S. Cl.
CPC .......... *G06Q 10/10* (2013.01); *G06Q 20/027* (2013.01); *G06Q 20/0655* (2013.01); *G06Q 20/108* (2013.01); *G06Q 20/3678* (2013.01); *G06Q 20/389* (2013.01); *G06Q 20/3825* (2013.01); *G06Q 20/3827* (2013.01); *G06Q 40/02* (2013.01); *G06Q 40/04* (2013.01); *H04L 9/3247* (2013.01); *G06Q 2220/00* (2013.01)

(56) References Cited

U.S. PATENT DOCUMENTS

| | | | |
|---|---|---|---|
| 11,182,776 | B1* | 11/2021 | Bhos .................... G06Q 20/389 |
| 2017/0230189 | A1 | 8/2017 | Toll et al. |
| 2017/0344983 | A1* | 11/2017 | Muftic ................ G06Q 20/065 |
| 2019/0385157 | A1 | 12/2019 | Mallela et al. |
| 2020/0202038 | A1* | 6/2020 | Zhang .................... G16B 20/20 |
| 2021/0112063 | A1* | 4/2021 | Castinado ............ G06Q 20/385 |
| 2021/0158443 | A1* | 5/2021 | Kilgore .............. G06Q 20/3678 |

OTHER PUBLICATIONS

"Tejasvi Alladi, Blockchain in Smart Grids: a review on different use cases, 8-15, Sep. 30, 2019" (Year: 2019).*

International Search Report, dated May 18, 2021, from corresponding International Application No. PCT/US2021/013890.

Written Opinion of the International Searching Authority, dated May 18, 2021, from corresponding International Application No. PCT/US2021/013890.

* cited by examiner

SYSTEMS AND METHOD FOR CONDUCTING AND MANAGING CRYPTOCURRENCY TRANSACTIONS

RELATED APPLICATIONS

This application claims priority to, and the benefit of, U.S. Provisional Patent Application Ser. No. 62/962,021 filed Jan. 16, 2020, the disclosure of which is hereby incorporated, by reference, in its entirety

BACKGROUND OF THE INVENTION

1. Field of the Invention

Embodiment are generally directed to systems and methods for conducting and managing cryptocurrency transactions

2. Description of the Related Art

Distributed ledgers, such as Blockchain, provide a unique system for recording transactions and storing data. In general, distributed ledgers hold a log of transactions (events) that may be replicated across a public or private distributed network. Cryptography and digital signatures may be used to determine valid parties and transactions such that all parties/observers agree on the order and state of the ledger in real-time without having to rely on a trusted third party to hold the true "golden copy." The distributed ledger thus provides a practically immutable, verifiably true audit trail.

SUMMARY OF THE INVENTION

Systems and methods for conducting and managing cryptocurrency transactions are disclosed. In one embodiment, a method for digital coin issuance may include: (1) receiving, at a ledger interoperability service and from a gateway communication service, a request to deposit a digital coin balance for an amount of funds for a client to a client digital coin wallet on a distributed ledger; (2) receiving, at an omnibus account, a transfer of the funds from a client demand deposit account for the client; (3) identifying, by the ledger interoperability service, an address for the client digital coin wallet on the distributed ledger using an address book; (4) submitting, by the ledger interoperability service, a request to the gateway communication service to issue the digital coin balance to the client digital coin wallet and to generate postings for the digital coin balance for the distributed ledger; and (5) receiving, by the ledger interoperability service, confirmation from gateway communication service of writing the digital coin balance to the client digital coin wallet.

In one embodiment, the address book may include an association for the client and the address for the client digital coin wallet on the distributed ledger.

In one embodiment, the method may further include orchestrating, by the ledger interoperability service, postings to the client demand deposit account and the client digital coin wallet using the gateway communication service.

In one embodiment, the method may further include digitally signing, by the ledger interoperability service, the request to the gateway communication service to issue the digital coin balance to the client digital coin wallet and to generate postings for the digital coin balance for the distributed ledger.

In one embodiment, the request to the gateway communication service to issue the digital coin balance to the client digital coin wallet and to generate postings for the digital coin balance for the distributed ledger may include an identifier for the client on the distributed ledger, a unique reference for the request generated by the ledger interoperability service, the address for the client digital coin wallet, and the amount of digital coins to be deposited to the client digital coin wallet.

In one embodiment, the request to the gateway communication service to issue the digital coin balance to the client digital coin wallet and to generate postings for the digital coin balance for the distributed ledger may include an application programmable interface call.

According to another embodiment, a method for digital coin transfer may include: (1) receiving, at a gateway communication service, a request to transfer a digital coin balance from a payor to a beneficiary, wherein the request may include payment information comprising a payor name, a payor account number, a beneficiary name, a beneficiary account number, and a purpose of the transfer; (2) identifying, by the gateway communication service, a beneficiary digital coin wallet address for a beneficiary digital coin wallet on a distributed ledger; (3) validating, by the gateway communication service, the payment information with the beneficiary; (4) receiving, at the gateway communication service, validation from the beneficiary, wherein the validation may be digitally signed by the beneficiary; (5) storing, by the gateway communication service, the validation; (6) receiving, at the gateway communication service, a transfer execution request from the payor, wherein the transfer execution request may include a payor digital coin wallet address for a payor digital coin wallet on the distributed ledger and a digital coin balance to be transferred; (7) writing, by the gateway communication service, the transfer to the payor digital coin wallet address and to the beneficiary digital coin wallet address, wherein the digital coin balance may be withdrawn from the payor digital coin wallet and the digital coin balance may be deposited to the beneficiary digital coin wallet; and (8) generating, by the gateway communication service and using a ledger interoperability service, postings to the distributed ledger and to the payor digital coin wallet and to the beneficiary digital coin wallet.

In one embodiment, the gateway communication service identifies the beneficiary digital coin wallet address on the distributed ledger using an address book.

In one embodiment, the address book may include an association for the beneficiary and the beneficiary digital coin wallet address.

In one embodiment, the method may further include orchestrating, by the ledger interoperability service, postings to the payor digital coin wallet and the beneficiary digital coin wallet using the gateway communication service.

In one embodiment, the validation from the beneficiary may include a hash of the payment information.

In one embodiment, the transfer execution request further may include a unique identifier that maps the validation to the transfer execution request and a hash of the payment information.

In one embodiment, the digital coin balance may be withdrawn from the payor digital coin wallet by cancelling the digital coin balance from the payor digital coin wallet, and the digital coin balance may be deposited to the beneficiary digital coin wallet by adding the digital coin balance to the beneficiary digital coin wallet.

In one embodiment, the transfer execution request may include an application programmable interface call.

According to another embodiment, a method for digital coin redemption may include: (1) receiving, at a gateway communication service, a request to redeem a digital coin balance to a cash account for a client, wherein the request may include a client identifier, a client digital coin wallet address on a distributed ledger address, and a digital coin balance to be redeemed; (2) initiating, by the gateway communication service, a redemption smart contract, wherein the redemption smart contract cancels the digital coin balance in the client digital coin balance; (3) communicating, to a ledger interoperability service, a notification of the redemption, wherein the ledger interoperability service identifies a client cash account for the client, and transfers a cash amount for the digital coin balance from an omnibus account to the client cash account; and (4) generating, by the gateway communication service and using a ledger interoperability service, postings to the distributed ledger and to the client cash account.

In one embodiment, the ledger interoperability service may identify a client cash account for the client using an address book, and the address book may include an association for the client and the client cash account.

In one embodiment, the method may further include orchestrating, by the ledger interoperability service, postings to the client demand deposit account and the client digital coin wallet.

In one embodiment, the method may further include digitally signing, by the ledger interoperability service, the request to the gateway communication service to redeem the digital coin balance.

In one embodiment, the request to the gateway communication service to redeem the digital coin balance to the client digital coin wallet may include an identifier for the client on the distributed ledger, a unique reference for the request generated by the ledger interoperability service, the address for the client digital coin wallet, and the amount of digital coins to be withdrawn from the client digital coin wallet.

In one embodiment, the request to the gateway communication service to redeem the digital coin balance to the client digital coin wallet and to generate postings for the digital coin balance for the distributed ledger may include an application programmable interface call.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally directed to systems and methods for conducting and managing cryptocurrency transactions.

Embodiments are directed to a cryptocurrency product that may leverage Blockchain and distributed ledger technology. Embodiments may provide the ability to record and transfer U.S. dollar (or other currency) deposit balances held on account at a financial institution using a combination of a blockchain/distributed ledger based recordkeeping ledger and payment rail (e.g., a "Blockchain ledger"), in addition to the other core product components described below.

The distributed ledger may be operated or controlled by a financial institution. Transfer of deposit balances using the distributed ledger may be affected via the transfer of blockchain-based digital coins (or tokens), where a digital coin balance represents the equivalent value of U.S. dollars, or other suitable currency. Clients using the system may transfer the digital coins to other clients to satisfy payment obligations including, for example, the settlement of transactions with other financial products. Clients may withdraw deposits held in digital coins by redeeming their digital coins for equivalent U.S. Dollar credit to a standard deposit account held in the client's name at the financial institution, and by making withdrawals from such account in the ordinary course at their election.

Clients may use a software application, such as an electronic wallet and/or Application Programming Interfaces ("APIs") to access and transfer their balance of digital coins, which may be located at one or more "address(es)" on the distributed ledger associated with the clients. In addition, a software application, such as a Ledger Interoperability Application, may facilitate the deposit balance transfer between the financial institution's standard deposit accounts and balances on the Blockchain ledger represented by the digital coins.

An example of a Ledger Interoperability Application is disclosed in U.S. Patent Application Ser. No. 63/071,727, the disclosure of which is hereby incorporated, by reference, in its entirety.

In one embodiment, digital coins may be an alternate way of representing and recording how many U.S. dollars (or other currency) each digital coin holder has on deposit at the financial institution (reflected as deposit liabilities of the financial institution in addition to deposit balances held in such client's standard deposit accounts) and how many such U.S. dollars (or other currency) are transferred among users of the system on the Blockchain ledger.

Figure 1:
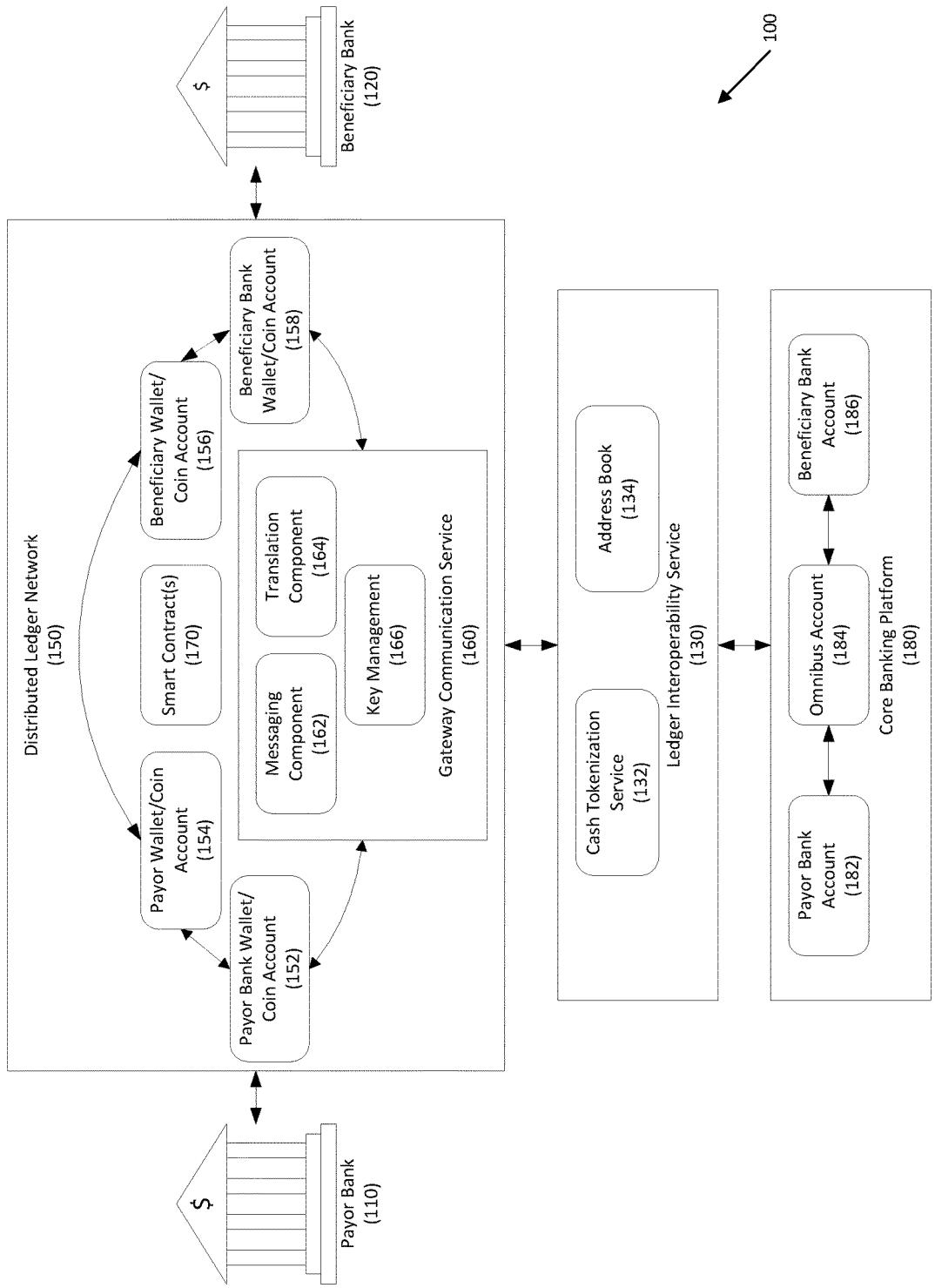
FIG. 1 depicts a system for conducting and managing cryptocurrency transactions according to one embodiment.

Referring to FIG. 1, an exemplary digital coin system is provided according to one embodiment. System 100 may include payor bank 110, which may hold account(s) for a client, such as a payor, and beneficiary bank 120, which may hold account(s) for a beneficiary.

The payor and/or the beneficiary may access and send instructions regarding its digital coin balance, which may include traditional web based user interface (e.g., wallets), APIs or other secure methods which may be developed over time and permitted for use by the financial institution's policies and procedures.

For example, wallets may include a software application that allows a client to interact with their balance of digital coins, which may be located at the "address(es)" on the distributed ledger associated with such client.

Payor bank 110 and beneficiary bank 120 may interact with distributed ledger network 150, which may be a blockchain or similar network. Distributed ledger network 150 may include accounts for the payor (e.g., payor wallet/coin account 154), payor bank 110 (e.g., payor bank wallet/coin account 152), the beneficiary (e.g., beneficiary wallet/coin account 156), and beneficiary bank 120 (e.g., beneficiary bank wallet/coin account 158). Each account may be associated with an address on the distributed ledger.

Address book 134 may be a directory that maintains a mapping between a demand deposit account (DDA), distributed ledger addresses, and other entity identifier information applicable to permissioned participants of the distributed ledger. Address Book 134 may be referenced during issuance and redemption of digital coins.

Distributed ledger network 150 may further include smart contract(s) 170 and gateway communication service 160 which may facilitate the transfer of digital coins on distributed ledger network 150.

Distributed ledger network 150 may interact with ledger interoperability service 130. Ledger interoperability service 130 may be a software application that facilitates balance transfer between the financial institution's standard deposit account operating ledger (e.g., omnibus and regular client DDA accounts) and the distributed ledger. Ledger interoperability service 130 may serve as a balance reflecting application that can reflect a client's balance onto the distributed ledger.

Examples of a suitable ledger interoperability service are disclosed in U.S. Patent Application Ser. No. 63/071,727, the disclosure of which is hereby incorporated, by reference, in its entirety.

Ledger interoperability service 130 may include cash tokenization service 132 and address book 134. Cash tokenization service 132 may be a software application that allows balance transfer/reflection between the distributed ledger and accounts on core banking platform 180, such as accounts 182, 186, and omnibus account 184.

Cash tokenization service 132 may create a signed and encrypted event payload (e.g., the movement of cash into omnibus account 184 resulting in a digital coin issuance event), for establishing non-repudiation (e.g., only the cash tokenization service 132 can create digital coins), and ensuring that only the intended destination can read it (e.g., spoofing prevention).

For example, cash tokenization service 132 may create digital coins for cash, and may redeem digital coins into an account. Cash tokenization service 132 may be hosted by a financial institution (not shown), which may include either of payor bank 110 or beneficiary bank 120. As will be discussed in greater detail below, during digital coin issuance, cash tokenization service 132 may receive funds from payor bank account 182 into omnibus account 184, and during digital coin redemption, cash tokenization service 132 may transfer funds from omnibus account 184 to beneficiary bank account 186.

Omnibus Account 184 may be the means by which the total deposit liability outstanding for the digital coins on the distributed is represented on the traditional systems of record.

Gateway communication service 160 may be a general-purpose mechanism for connecting non-distributed ledger internal/external systems (not shown), with distributed ledger platforms. Gateway communication service 160 may include messaging component 162, translation component 164, and key management integration component 166. Messaging component 162 may provide a reliable messaging layer that allows transaction parties to exchange Personally Identifiable Information (PII) related to the transaction prior to the settlement of value on the distributed ledger through the usage of digital coins, so that no PII is stored on the distributed ledger.

Translation component 164 may provide translation between business domain and the distributed ledger platforms.

Exemplary suitable gateways are disclosed in U.S. patent application Ser. Nos. 17/124,204; 16/020,473; and U.S. Provisional patent Application Ser. No. 62/525,600, the disclosures of which are hereby incorporated, by reference, in their entireties.

Key management integration component 166 may integrate with key management solutions and may facilitate signing of distributed ledger transactions and other cryptographic operations.

In embodiments, clients may use public key infrastructure (PKI) based cryptography to secure and authenticate. The PKI deployment may include RSA-based keys for interaction between the financial institution's internal systems/clients and a gateway communication service. This facilitates a secure channel for data transfer (encrypts payloads) and authenticates tamper-proof initiation of digital coins events in lifecycle.

Private key mapping may be used to map blockchain public addresses, which may be extracted from a key management solution through gateway communication service 160 for digital coin transactions (e.g., issuance, transfer, and redemption balance changes). These keys may be secured a key-vault (not shown).

Figure 2:
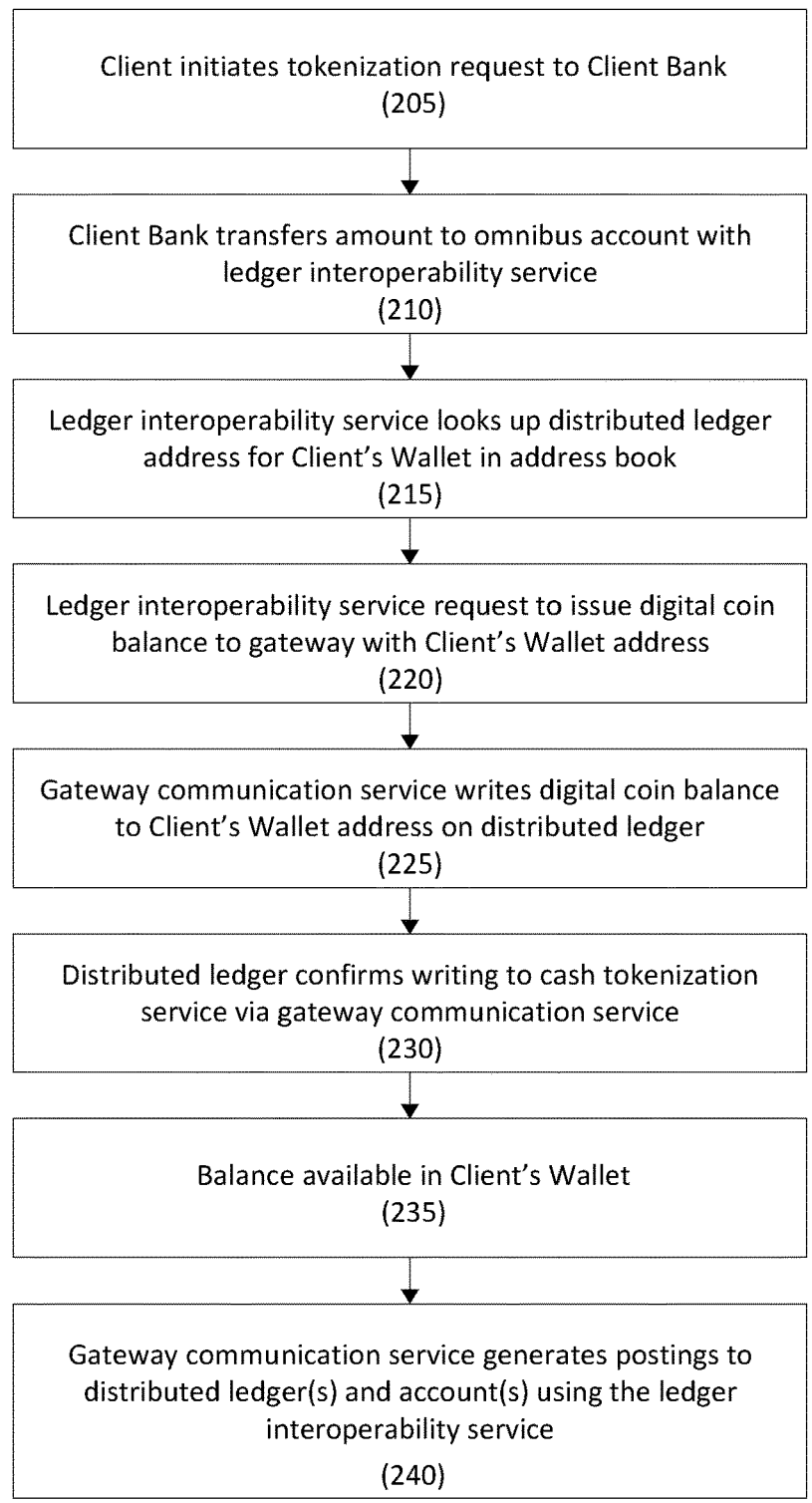
FIG. 2 depicts a method for digital coin issuance according to an embodiment.

Referring to FIG. 2, a method for digital coin issuance is illustrated according to an embodiment. In step 205, a client may request tokenization of funds with the client's bank, such as depositing digital coins to the client's digital coin account. In one embodiment, the client may identify the amount of funds to tokenize to the client's bank.

In step 210, the client bank may transfer the amount to tokenize from the client's account to an omnibus account, such as an omnibus account provided by financial institution.

In step 215, the ledger interoperability service may look up the distributed ledger address for the client's digital coin wallet from an address book. In one embodiment, the address book may maintain a mapping of registered clients to distributed ledger address for the client's digital coin wallet. In one embodiment, the ledger interoperability may use a client identifier, a client DDA number, etc. to look up the address.

In step 220, the ledger interoperability may submit a request to issue and deposit the digital coin balance to the client's digital coin wallet to a gateway communication service. For example, the ledger interoperability may integrate with a core banking platform via the ledger interoperability service to debit the client's cash account and generate posting(s) for the equivalent amount of digital coins to the client's digital coin wallet.

In one embodiment, the request may include a ParticipantID (e.g., a Client ID for the client on the distributed ledger), a UniqueRefID (e.g., a unique ID on the distributed ledger that may be generated by the ledger interoperability service), the client digital coin wallet address on the distributed ledger, and the amount.

In one embodiment, PKI cryptography may be used to secure the request. For example, the ledger interoperability service may sign the request, which may be an API call. The gateway communication service may use a corresponding public key to validate the API call.

In step 225, the gateway communication service may deposit the digital coin amount by writing the digital coin balance to the client's digital coin wallet address on the distributed ledger. For example, the gateway communication service may extract the distributed ledger private key from a key management solution and may sign the smart contract transaction payload.

In step 230, the distributed ledger may confirm the writing of the balance to the ledger interoperability service via the gateway communication service.

In step 235, the digital coin balance may be visible on the client's digital coin wallet user interface. For example, the wallet may submit a balance request to the gateway communication service, and the gateway communication service may submit an API query to the distributed ledger for the balance. The distributed ledger may return the balance, and the gateway communication service may return the balance to the wallet.

In step 240, the gateway communication service may integrate with the ledger interoperability service orchestrate postings from the core banking platform to the distributed ledgers and the client's DDA.

Figure 3:
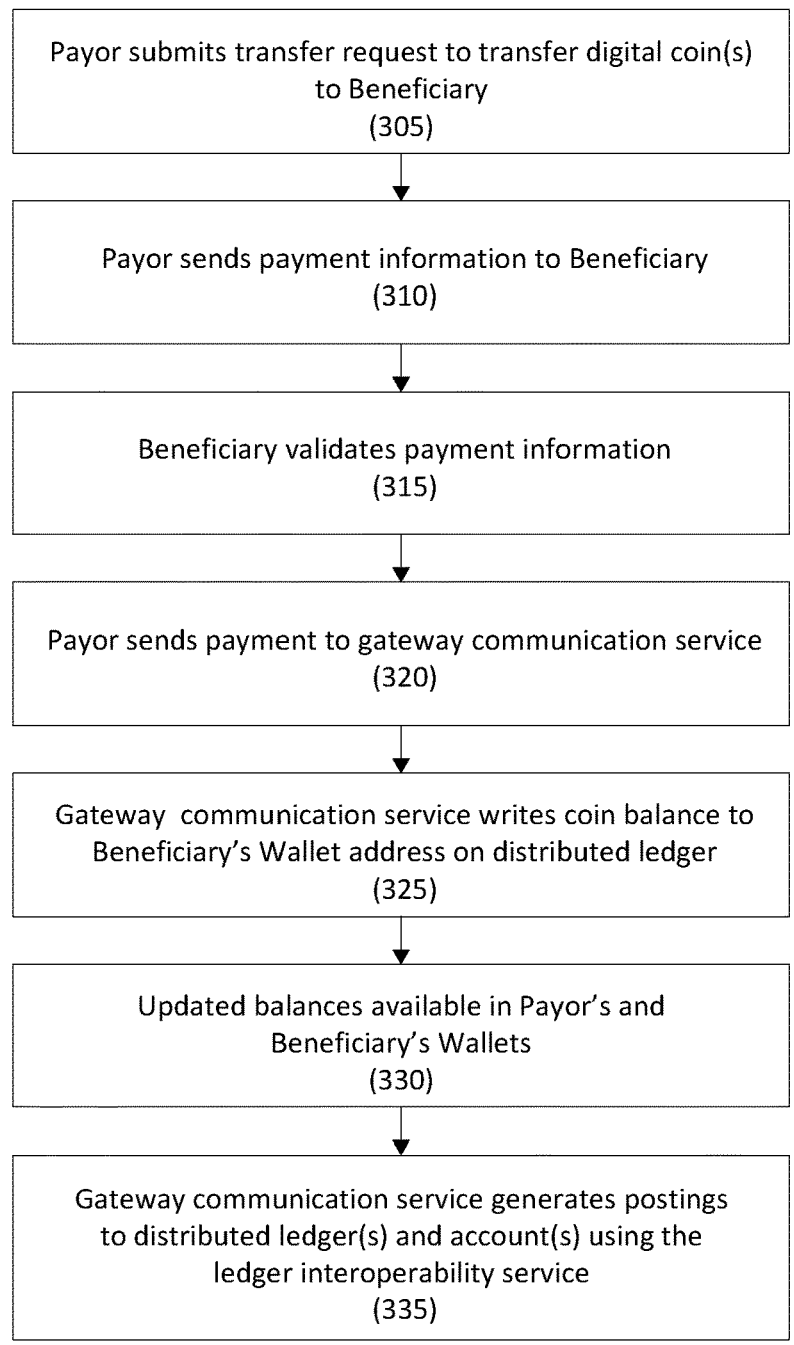
FIG. 3 depicts a method for digital coin transfer according to an embodiment.

Referring to FIG. 3, a method for digital coin transfer is illustrated according to an embodiment.

In step 305, a payor may submit a request to transfer one or more digital coins to a beneficiary. In one embodiment, the transfer process may be a two-step process, with a validation step and a transfer execution step.

In one embodiment, the payor may submit the request using, for example, a wallet user interface. For example, the payor may select the beneficiary using a drop-down menu. The drop-down menu may include participants, or a subset of participants, that are maintained in the address book. The address book may be maintained on the distributed ledger.

In step 310, the gateway communication service may validate payment information with the beneficiary. For example, the payor may send payment information details to the beneficiary as part of validation via "ValidatePaymentInfo" API. In one embodiment, the payment information may include the payor name, the payor's account number, the beneficiary's name, the beneficiary's account number, and the purpose of the payment. In one embodiment, the transfer request may further include the distributed ledger addresses for the payor's wallet and the beneficiary's wallet.

In one embodiment, PKI cryptography may be used to secure the transfer request. The payor may sign the transfer request using a private key, and the beneficiary may use the corresponding public key to validate the request.

In one embodiment, the payment information may be sent to the gateway, which may provide the payment information to the beneficiary.

In step 315, the beneficiary may validate the payment information. The beneficiary may sign a response, and may send the response to the payor. The response may be provided via the gateway communication service, which may store the validated payment information.

In step 320, the payor may submit a transfer execution request to the gateway communication service. The payor may sign the transfer execution request with its private key. In one embodiment, the transfer execution request may be submitted concurrently with the validation request in step 305.

In one embodiment, the transfer execution request may include the payor's wallet address on the distributed ledger, the beneficiary's wallet address on the distributed ledger, the amount of digital coins to be transferred, a unique identifier, and a hash of the payment information.

In one embodiment, the unique identifier may be generated by the payor and may be a unique key that maps the validated payment information to the transfer request.

In one embodiment, the hash of the payment information may be a hash value calculated from the payment information using, for example, SHA-256. This transforms the fields into a hexadecimal string that is undecipherable, but can be validated (e.g., a hash of X=hash of Y means that X=Y, but neither underlying X information nor Y information is visible).

In step 325, the gateway communication service may write the transfer to the wallets on the distributed ledger. For example, the gateway communication service may use a smart contract to perform the transfer.

In step 330, the distrusted ledger may confirm the transfer, and the gateway communication service may notify the payor and the beneficiary of the transfer. In one embodiment, the updated digital coin balances may be visible in the payor's and the beneficiary's wallet applications.

In step 335, the gateway communication service may integrate with the ledger interoperability service to orchestrate postings from the core banking platform to the distributed ledger(s) and each party's DDA.

Figure 4:
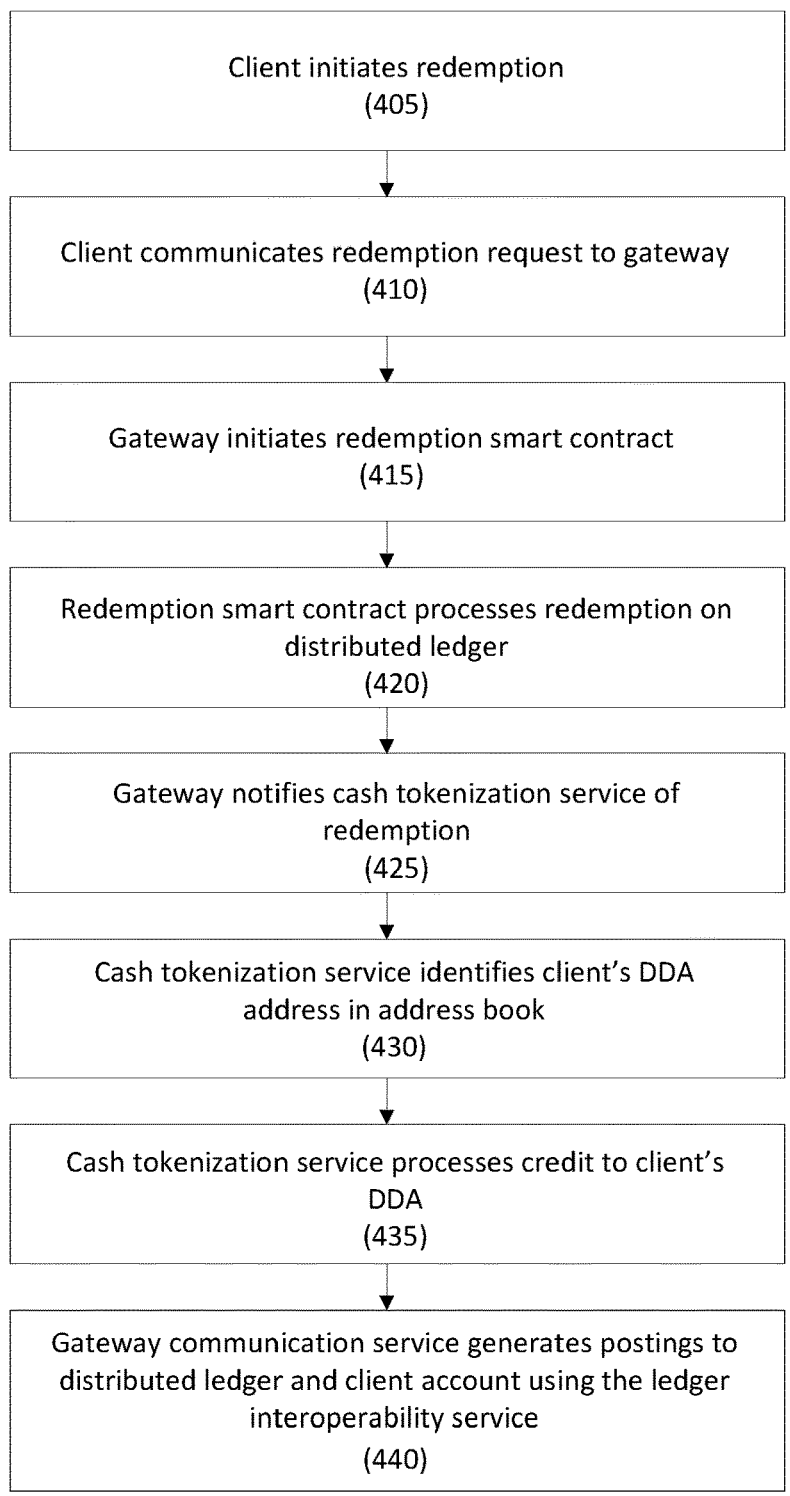
FIG. 4 depicts a method for digital coin redemption according to an embodiment.

Referring to FIG. 4, a method for digital coin redemption is illustrated according to an embodiment.

In step 405, a client may initiate a digital coin redemption request. For example, the digital coin redemption request may be initiated using the client's wallet user interface, and may withdraw the digital tokens from the client's digital coin wallet.

In step 410, the redemption request may be communicated to the gateway communication service. The redemption request may include a client identifier for the client, a unique identifier generated by the client that refers to the redemption, the distributed ledger address of the client's wallet (which may be deduced from the address book), and the number of digital coins being redeemed.

In step 415, the gateway communication service may redeem the digital coins by initiating a redemption smart contract. In step 420, the redemption smart contract may process the redemption on the distributed ledger. In one embodiment, the redemption process cancels the digital coins for the amount of the redemption on the distributed ledger.

In step 425, the gateway communication service may notify the ledger interoperability service of the redemption, and in step 430, the ledger interoperability service may look up the client's DDA information using, for example, the address book. In step 435, the ledger interoperability service may then update the ledger interoperability service's omnibus account. In one embodiment, the omnibus account may be debited and client's DDA may be credited.

In step 440, the gateway communication service may integrate with the ledger interoperability service to orchestrate postings from the core banking platform to the distributed ledger(s) and the client's DDA.

In embodiments, the financial institution and client may be able to terminate services (e.g., offboard the client) in accordance with the account terms and product service terms. For example, upon the effective date of the termination, the financial institution may automatically redeem any and all outstanding digital coins (i.e., distributed ledger balances) through the redemption processes, as if client had submitted a redemption request.

EXAMPLES

The following non-limiting examples are provided.

Example 1: Transfer of Digital Coins Amongst Clients with DDAs in Same Booking Location/Currency as Omnibus Account Description: Client A and Client B are corporate clients having DDA accounts with a financial institution's NY Branch, which are each denominated in U.S. Dollars. Client A seeks to make a payment of USD 100 million to Client B. Digital coins are used to facilitate the above transfer on a near real-time and 24×7 basis.

Step 1—Issuance of Digital Coin Balance to Client A: Balance position of both client's DDA and distributed ledger accounts prior to digital coin issuance:

| DDA Accounts | Balance ($ mn) |
| --- | --- |
| Client A-NY Branch | $120 USD |
| Omnibus NY Branch | $0 USD |
| Client B-NY Branch | $0 USD |

| Distributed Ledger Accounts | Balance ($ mn) |
| --- | --- |
| Client A | $0 USD |
| Client B | $0 USD |

Client A requests issuance of USD $100 million in digital coins via current channels or through API's to their wallet on the distributed ledger.

Balance position of both client's DDA and distributed ledger accounts subsequent to the Coin Issuance:

| DDA Accounts | Balance ($ mn) |
| --- | --- |
| Client A-NY Branch | $20 USD |
| Omnibus NY Branch | $100 USD |
| Client B-NY Branch | $0 USD |

Client A's wallet on the distributed ledger is credited with the $100 million USD in digital coins.

| Distributed ledger Accounts | Balance ($ mn) |
| --- | --- |
| Client A | $100 USD |
| Client B | $0 USD |

Step 2—Transfer of Digital Coin Balance from Client A to Client B using Distributed Ledger: Client A instructs the transfer of $100 million USD in digital coins from client A's address to client B's address on the distributed ledger utilizing the applicable Customer Connectivity Method.

| DDA Accounts | Balance ($ mn) |
| --- | --- |
| Client A-NY Branch | $20 USD |
| Omnibus NY Branch | $100 USD |
| Client B-NY Branch | $0 USD |

Client B's wallet shows that client B's address on the distributed ledger is credited with the $100 million USD in Digital Coin (100 million digital coins).

| Distributed ledger Accounts | Balance ($ mn) |
| --- | --- |
| Client A | $0 USD |
| Client B | $100 USD |

Step 3—Redemption of Digital Coin Balance by Client B: Client B instructs redemption of $100 million USD digital coins through their Customer Connectivity Method (Wallet).

Financial Institution's NY Branch debits the corresponding $100 million from the Omnibus Account and credits the Client B's DDA.

| DDA Accounts | Balance ($ mn) |
| --- | --- |
| Client A-NY Branch | $20 USD |
| Omnibus NY Branch | $0 USD |
| Client B-NY Branch | $100 USD |

$100 million USD digital coins is debited from Client B's digital coin balance on the distributed ledger (the digital coins are canceled from the distributed ledger).

| Distributed ledger Accounts | Balance ($ mn) |
| --- | --- |
| Client A | $0 USD |
| Client B | $0 USD |

Example #2: Supplementary Foreign Branch Services to Facilitate Transfer of Digital Coins Involving Clients with DDAs in Different Location/Currency as Omnibus Account (with Off-Distributed Ledger Foreign Exchange (FX))

Description: Client A & Client B are corporate clients having DDA accounts with the Financial Institution's NY Branch and Singapore (SG) Branch, respectively.

Client A's DDA account is denominated in USD and Client B's DDA account is denominated in Singapore Dollar (SGD).

Client A seeks to make a payment of USD 100 million to Client B, who would then want the USD 100 million to be converted and credited to their SGD DDA account with the SG Branch. Digital coins are used to facilitate the above transfer on a near real-time and 24×7 basis.

Step 1—Issuance of Digital Coin Balance to Client A: Balance position of both client's DDA and Distributed ledger accounts prior to digital coin issuance:

| DDA Accounts | Balance ($ mn) |
| --- | --- |
| Client A-NY Branch | $120 USD |
| Omnibus NY Branch | $0 USD |
| Client B-SG Branch | $0 SGD |
| SG Branch's Nostro at NY Branch | $0 USD |

| Distributed Ledger Accounts | Balance ($ mn) |
| --- | --- |
| Client A | $0 USD |
| Client B | $0 USD |
| SG Branch | $0 USD |

Client A requests issuance of USD $100 million in digital coins via current channels or through API's to their wallet on the distributed ledger Balance position of both clients' DDAs and distributed ledger accounts subsequent to the digital coin issuance:

| DDA Accounts | Balance ($ mn) |
| --- | --- |
| Client A-NY Branch | $20 USD |
| Omnibus NY Branch | $100 USD |
| Client B-SG Branch | $0 SGD |
| SG Branch's Nostro at NY Branch | $0 USD |

Client A's wallet shows the corresponding balance in Client A's address that has been credited with the $100 million USD in digital coins.

| Distributed ledger Accounts | Balance ($ mn) |
| --- | --- |
| Client A | $100 USD |
| Client B | $0 USD |
| SG Branch | $0 USD |

Step 2—Transfer of Digital Coin Balance from Client A to Client B using Distributed ledger: Client A instructs the transfer of $100 million USD in digital coins from client A's address to client B's address on the distributed ledger utilizing the applicable Customer Connectivity Method.

| DDA Accounts | Balance ($ mn) |
| --- | --- |
| Client A-NY Branch | $20 USD |
| Omnibus NY Branch | $100 USD |
| Client B-SG Branch | $0 SGD |
| SG Branch's Nostro at NY Branch | $0 USD |

Client B's wallet on Distributed ledger is credited with the $100 million USD in digital coins.

| Distributed ledger Accounts | Balance ($ mn) |
| --- | --- |
| Client A | $0 USD |
| Client B | $100 USD |
| SG Branch | $0 USD |

Step 3—Transfer of Digital Coin Balance by Client B to SG Branch: Client B instructs the transfer of $100 million USD digital coins to SG and requests for credit to their SGD DDA account based on the current spot FX (USD: SGD is 1:1.4).

$100 million USD Digital Coin is transferred from Client B Distributed ledger to SG The FX conversion from USD to SGD is executed by SG in favor of Client B against the USD digital coin position held of $100 million now held by SG Branch.

Note: FX Conversion is done off distributed ledger with fiat currency of equivalent value credited to Client B's SG Branch DDA, in accordance with established processes for Spot FX.

| DDA Accounts | Balance ($ mn) |
| --- | --- |
| Client A-NY Branch | $20 USD |
| Omnibus NY Branch | $100 USD |
| Client B-SG Branch | $140 SGD |
| SG Nostro NY Branch | $0 USD |

(Note—SG Branch's Nostro balance has been used for the Spot FX conversion and credit to Client B's SG Branch DDA Account. In the alternative, SG Branch could choose to redeem its digital coin balance to fund its Nostro per the below Step 4 first, and then use such funds for the Spot FX transaction. These steps may occur substantially simultaneously).

| Distributed ledger Accounts | Balance ($ mn) |
| --- | --- |
| Client A | $0 USD |
| Client B | $0 USD |
| SG Branch | $100 USD |

Step 4—Redemption of Digital Coin Balance by SG Branch: SG Branch instructs redemption of $100 million USD digital coins through their Customer Connectivity Method.

NY Branch debits the corresponding $100 million from the Omnibus Account and credits the SG Branch nostro account

| DDA Accounts | Balance ($ mn) |
| --- | --- |
| Client A-NY Branch | $20 USD |
| Omnibus NY Branch | $0 USD |
| Client B-SG Branch | $140 SGD |
| SG Nostro NY Branch | $100 USD |

$100 million USD digital coins is debited from SG Branch Digital Coin balance on the distributed ledger (the digital coins are redeemed from the distributed ledger).

| Distributed ledger Accounts | Balance ($ mn) |
| --- | --- |
| Client A | $0 USD |
| Client B | $0 USD |
| SG Branch | $0 USD |

Use Case #3 (Paying for Delivery of another Tokenized Asset): Payment from client A to client B for purpose of paying for delivery of another tokenized asset.

Use case description: Digital coins may be use for the payment leg of a delivery versus payment (DvP) tokenized transactions (e.g., the delivery of another "digital asset" or "token" on distributed ledger representing a non-cash asset).

Illustrative Context: Client A has 100 million digital coins representing the equivalent amount in U.S. dollars, and Client B has an "asset token" (digital representation of the asset on distributed ledger).

Transfer: Client A instructs payment of digital coins to Client B as described above.

Client B transfers an "asset token" (digital representation of the asset on distributed ledger) that will be sent to Client A's "asset token" address in exchange for the payment of digital coins.

Exchange of the "asset token" and digital coins will occur if both payment and asset legs are in good order and available for settlement.

Redemption: Client B redeems digital coins as outlined above. Client A will have possession of the "asset token" and may redeem with, for example, the asset custodian.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for digital coin transfer, comprising:

receiving, at a gateway communication service and from a payor digital wallet user interface, a request to transfer a digital coin balance from a payor to a beneficiary, wherein the request comprises payment information comprising a payor name, a payor account number, a beneficiary name, a beneficiary account number, and a purpose of the transfer;

identifying, by the gateway communication service, a beneficiary digital coin wallet distributed ledger address for a beneficiary digital coin wallet for the beneficiary name and/or the beneficiary account number on a distributed ledger using an address book comprising a mapping of registered clients to distributed ledger addresses for digital coin wallets on the distributed ledger;

providing, by the gateway communication service, the payment information to the beneficiary, wherein the beneficiary is configured to validate the payment information and generate a hash value of the payment information;

receiving, at the gateway communication service, validation from the beneficiary, wherein the validation comprises the hash value and is digitally signed by the beneficiary;

storing, by the gateway communication service, the validation;

receiving, at the gateway communication service, a transfer execution request from the payor, wherein the transfer execution request comprises a payor digital coin wallet address for a payor digital coin wallet on the distributed ledger and a digital coin balance to be transferred, and a unique identifier that maps the validation to the transfer execution request to the hash of the payment information;

writing, by the gateway communication service and using a smart contract, the transfer to the payor digital coin wallet address and to the beneficiary digital coin wallet address, wherein the digital coin balance is withdrawn from the payor digital coin wallet and the digital coin balance is deposited to the beneficiary digital coin wallet; and generating, by the gateway communication service and using a ledger interoperability service, postings to the distributed ledger and to the payor digital coin wallet and to the beneficiary digital coin wallet.

2. The method of claim 1, further comprising:
orchestrating, by the ledger interoperability service, postings to the payor digital coin wallet and the beneficiary digital coin wallet using the gateway communication service.

3. The method of claim 1, wherein the digital coin balance is withdrawn from the payor digital coin wallet by cancelling the digital coin balance from the payor digital coin wallet, and the digital coin balance is deposited to the beneficiary digital coin wallet by adding the digital coin balance to the beneficiary digital coin wallet.

4. The method of claim 1, wherein the transfer execution request comprises an application programmable interface call.

5. A non-transitory computer readable storage medium, including instructions stored thereon, which when read and executed by one or more computer processors, cause the one or more computer processors to perform steps comprising:
receiving, from a payor digital wallet user interface, a request to transfer a digital coin balance from a payor to a beneficiary, wherein the request comprises payment information comprising a payor name, a payor account number, a beneficiary name, a beneficiary account number, and a purpose of the transfer;
identifying beneficiary digital coin wallet distributed ledger address for a beneficiary digital coin wallet for the beneficiary name and/or the beneficiary account number on a distributed ledger using an address book comprising a mapping of registered clients to distributed ledger addresses for digital coin wallets on the distributed ledger;
providing the payment information to the beneficiary, wherein the beneficiary is configured to validate the payment information and generate a hash value of the payment information;
receiving, from the beneficiary, a validation that comprises the hash value and is digitally signed by the beneficiary;
storing the validation;
receiving, from the payor, a transfer execution request, wherein the transfer execution request comprises a payor digital coin wallet address for a payor digital coin wallet on the distributed ledger and a digital coin balance to be transferred, and a unique identifier that maps the validation to the transfer execution request to the hash of the payment information;
writing, using a smart contract, the transfer to the payor digital coin wallet address and to the beneficiary digital coin wallet address, wherein the digital coin balance is withdrawn from the payor digital coin wallet and the digital coin balance is deposited to the beneficiary digital coin wallet; and
generating, using a ledger interoperability service, postings to the distributed ledger and to the payor digital coin wallet and to the beneficiary digital coin wallet.

6. The non-transitory computer readable storage medium of claim 5, further including instructions stored thereon, which when read and executed by one or more computer processors, cause the one or more computer processors to orchestrate postings to the payor digital coin wallet and the beneficiary digital coin wallet.

7. The non-transitory computer readable storage medium of claim 5, wherein the digital coin balance is withdrawn from the payor digital coin wallet by cancelling the digital coin balance from the payor digital coin wallet, and the digital coin balance is deposited to the beneficiary digital coin wallet by adding the digital coin balance to the beneficiary digital coin wallet.

8. The non-transitory computer readable storage medium of claim 5, wherein the transfer execution request comprises an application programmable interface call.

\* \* \* \* \*